United States Patent
Higashide

(10) Patent No.: US 6,830,021 B2
(45) Date of Patent: Dec. 14, 2004

(54) ENGINE CAMSHAFT DRIVING ARRANGEMENT

(75) Inventor: Shinji Higashide, Mori-machi (JP)

(73) Assignee: Kabushiki Kaisha Y.E.D., Mori-machi (JP)

( * ) Notice: Subject to any disclaimer, the term of this patent is extended or adjusted under 35 U.S.C. 154(b) by 0 days.

(21) Appl. No.: 10/708,578

(22) Filed: Mar. 12, 2004

(65) Prior Publication Data

US 2004/0187821 A1 Sep. 30, 2004

(30) Foreign Application Priority Data

Mar. 26, 2003 (JP) ........................................ 2003-085387

(51) Int. Cl.$^7$ ................................................. F01L 1/02
(52) U.S. Cl. ............................... 123/90.27; 123/90.31; 123/90.38; 123/195 C; 277/590
(58) Field of Search .......................... 123/90.27, 90.31, 123/90.38, 195 C, 198 E, 198 F, 193.5, 193.3, 193.4, 193.2; 277/590, 591

(56) References Cited

U.S. PATENT DOCUMENTS

| | | | | |
|---|---|---|---|---|
| 5,010,855 A | * | 4/1991 | Ogami et al. | 123/90.31 |
| 5,740,768 A | * | 4/1998 | Sakurai et al. | 123/90.27 |
| 5,873,336 A | * | 2/1999 | Uchida | 123/90.31 |
| 6,325,033 B1 | * | 12/2001 | Iwata | 123/90.31 |
| 6,478,305 B1 | * | 11/2002 | Iwata | 277/591 |

FOREIGN PATENT DOCUMENTS

JP 08-121188 5/1996

* cited by examiner

Primary Examiner—Thomas Denion
Assistant Examiner—Ching Chang
(74) Attorney, Agent, or Firm—Ernest A Beutler

(57) ABSTRACT

Several embodiments of simplified structures for internal combustion engine timing drives that limit undesirable degrees of movement of a flexible transmitter pivotal arm by providing one or more projections on a removable component of the engine such as the cylinder head gasket that provide contacting edges that cooperate with the tensioner arm.

11 Claims, 4 Drawing Sheets

US 6,830,021 B2

ENGINE CAMSHAFT DRIVING ARRANGEMENT

BACKGROUND OF INVENTION

This invention relates to a camshaft driving arrangement for an internal combustion engine and more particularly to an improved tensioner arrangement for such drives.

In four cycle internal combustion engines it is the practice to operate the engine valves from one or more camshafts that are driven in timed relation to the engine crankshaft. The timing drive drives the cam shaft at one half crankshaft speed. Frequently a flexible transmitter such as a belt or chain is employed for this purpose. This is particularly done where the camshaft is journalled in or near the cylinder head where overhead valves are employed.

Since the flexible transmitters commonly employed may change in length during their use and for other reasons it is the common practice to employ a tensioner mechanism on the drive portion of the transmitter for maintaining a constant tension on the transmitter. A pivotally supported tensioner arm is generally employed for this purpose.

An example of a conventional camshaft driving mechanism of this type is shown in Japanese Published Patent Application, publication number Hei 8-121188. As seen therein, the engine comprises an engine body that includes a cylinder block in which a crankshaft is journalled with its rotational axis extending generally horizontally. Camshafts of the valve driving mechanism are supported with the upper part of the engine body and specifically in the cylinder head thereof. A flexible transmitter in the form of a timing chain drives the camshaft in timed relationship with the crankshaft. To maintain the desired tension in the timing chain, a tensioner arm has one end thereof pivoted on the engine body for pivotal movement about an axis that is parallel to the crankshaft axis for engagement with the driving flight of the timing chain. In this way, when the engine is driven, the camshafts operate the intake and exhaust valves in a known manner. The tension arm prevents the timing chain from becoming too slack, thereby preventing the timing chain from vibrating undesirably and producing undesirable noise and making power transmission from the crankshaft to the camshafts smooth.

However, the tension arm is in a free state at the time of assembling or maintenance of the engine and one end of the tension arm may freely swing with its own weight outward of the engine body. Thus the tension arm might interfere with attaching other devices to the engine body. To avoid this it is the practice to provide a temporary stop means to temporarily restrain the movement of the tension arm at the time of assembling or servicing the engine. However, this complicate the jobs of assembling and servicing the engine.

Therefore it is an object of this invention to provide a simple and effective way of preventing unwanted movement of the tensioner arm during assembly and servicing without requiring removable units for this purpose.

SUMMARY OF INVENTION

This invention is adapted to be embodied in an internal combustion engine comprising an engine body rotatably journaling a crankshaft therein for rotation about a rotational axis. The engine body has an opening at an end thereof spaced from the rotational axis of the crankshaft and adapted to be closed at least in part by a cylinder head detachably connected thereto. The cylinder head journals at least one camshaft for operating at least one valve supported thereon. At least one flexible transmitter drives the camshaft from the crankshaft. A tensioner arm is journalled for pivotal movement by the engine body and has a portion thereof engaged with the flexible transmitter for maintaining a tension therein. The tensioner arm has a portion that extends outwardly beyond the engine body opening. In accordance with the invention, a removable portion of the engine is affixed relative to the engine body and the cylinder head and retained on the engine body when the cylinder head is removed from the engine body. The removable portion is positioned to extend into a portion of the engine body opening from the engine body to engage the tensioner arm and limit its pivotal movement when the cylinder head is removed from the engine body.

DETAILED DESCRIPTION

Figure 1:
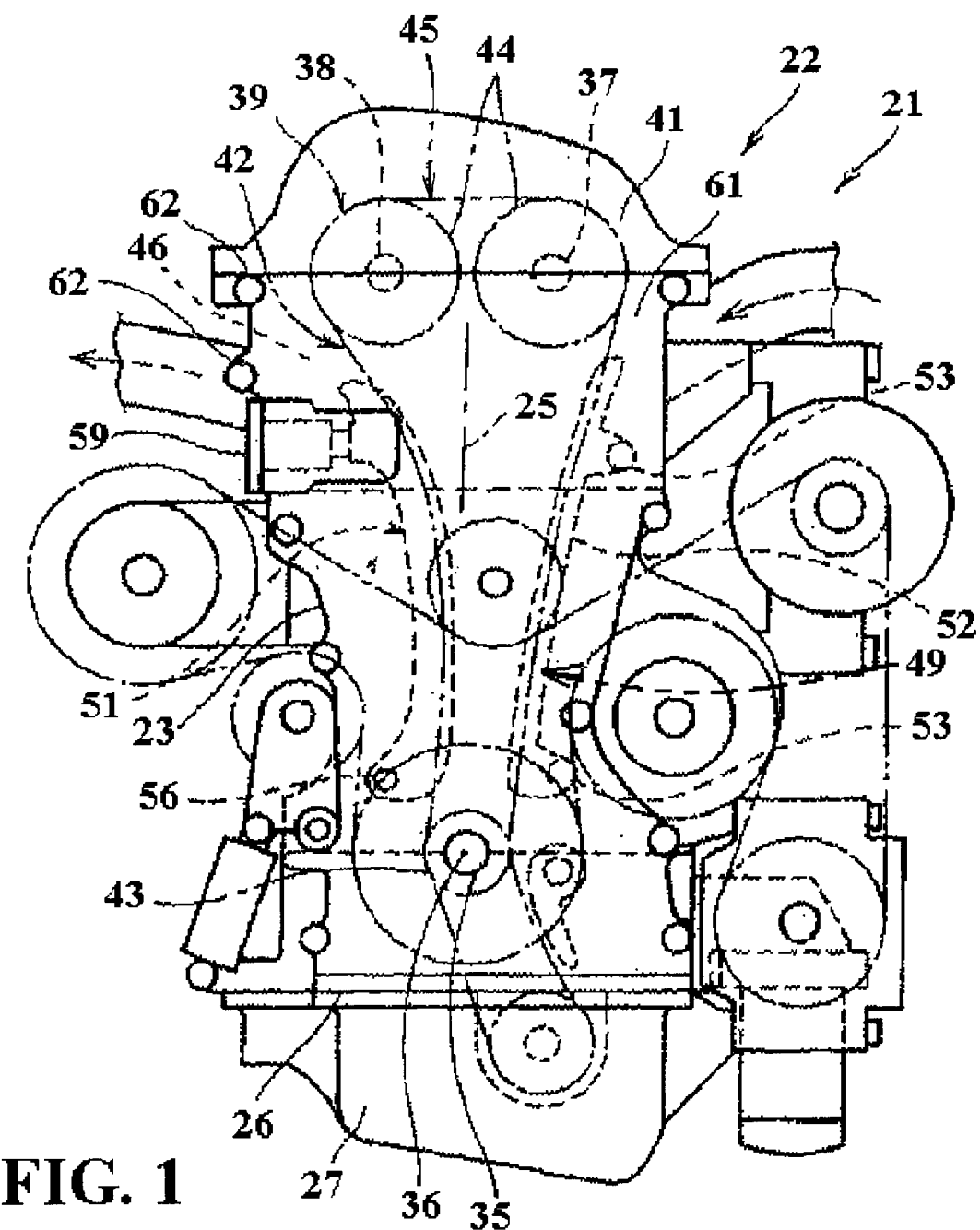
FIG. 1 is a front elevational view of an internal combustion engine constructed in accordance with the invention with certain of the internal components shown in phantom.
Figure 2:
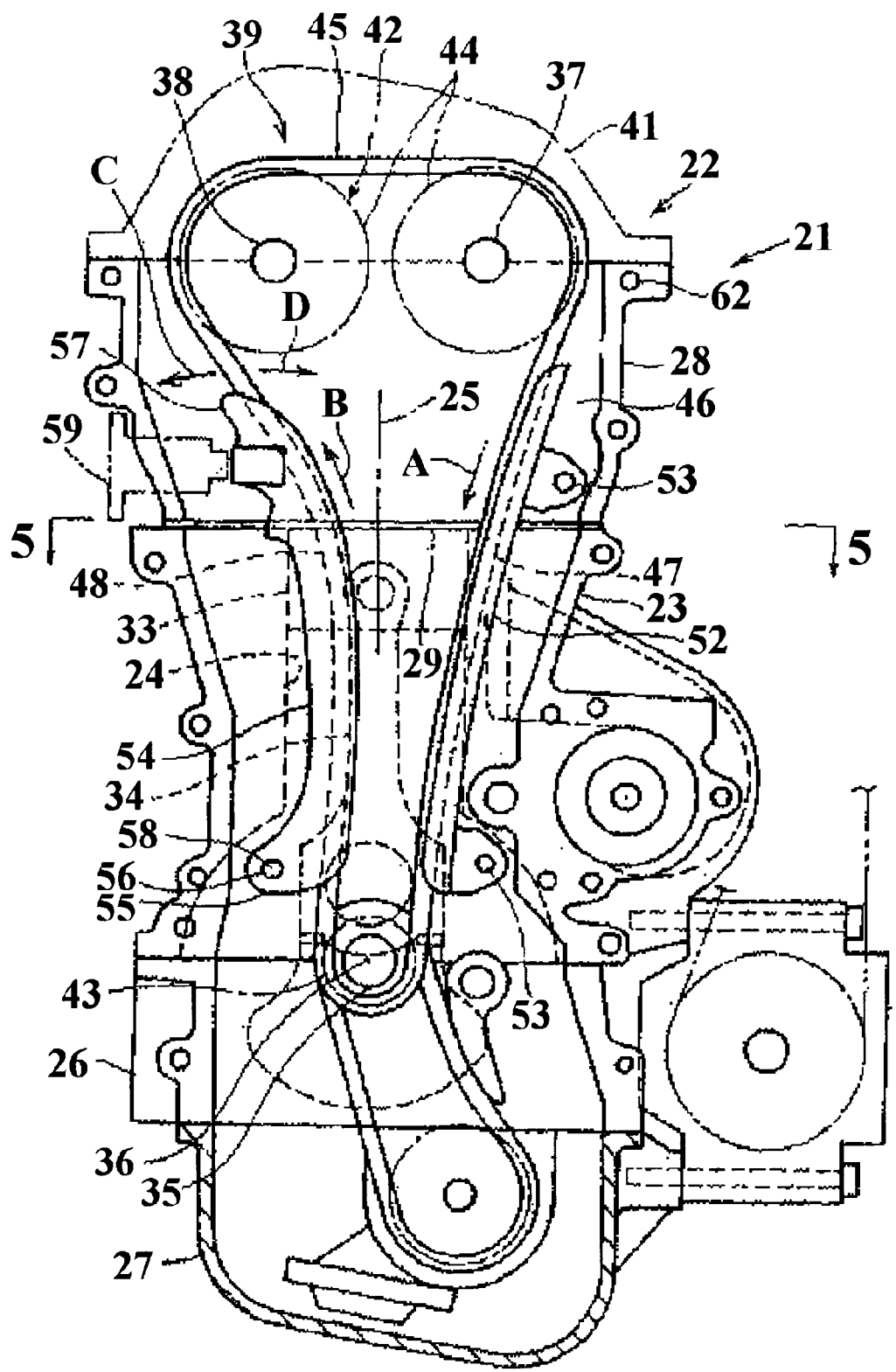
FIG. 2 is a view looking in the same direction as FIG. 1, but with the engine front cover removed.

Referring now in detail to the drawings and initially to FIGS. 1 and 2, a multi-cylinder, four-cycle internal combustion engine embodying the invention is indicated generally by the reference numeral 21. Although the application of the invention is not so limited, in the illustrated embodiment, the invention is of the four cylinder in line type and is adapted to be mounted on vehicles such as automobiles.

The engine 21 is comprised of a main engine assembly, indicated generally at 22 that is constructed for support within a vehicle body (not shown). The engine assembly 22 is comprised of a main engine body comprised of a cylinder block 23 having plural cylinder bores 24 with their axes 25 extending generally vertically and parallel to each other. A bulkhead 26 is detachably fixed to the underside of the cylinder block 23 to form the upper portion of a crankcase in cooperation with the lower part of the cylinder block 23. The crankcase is completed by an oil pan 27 to hold lubricant oil that is detachably fixed to the underside of the bulkhead 26 in any known manner.

A cylinder head 28 is fixed in a known manner to the top surface of the cylinder block 23 to cover its otherwise open top end and to close the upper ends of the cylinder bores 24. A cylinder head gasket, indicated generally at 29, is interposed between the top surface of the cylinder block 23 and the underside of the cylinder head 28 to seal the gap between their two facing surfaces. Locating dowels 31 (FIG. 5) are provided to accurately position the components 23, 26 to 29 of the engine assembly 22 in the direction at right angles to the axes 25 of the cylinder bores 24.

Figures 3, 4:
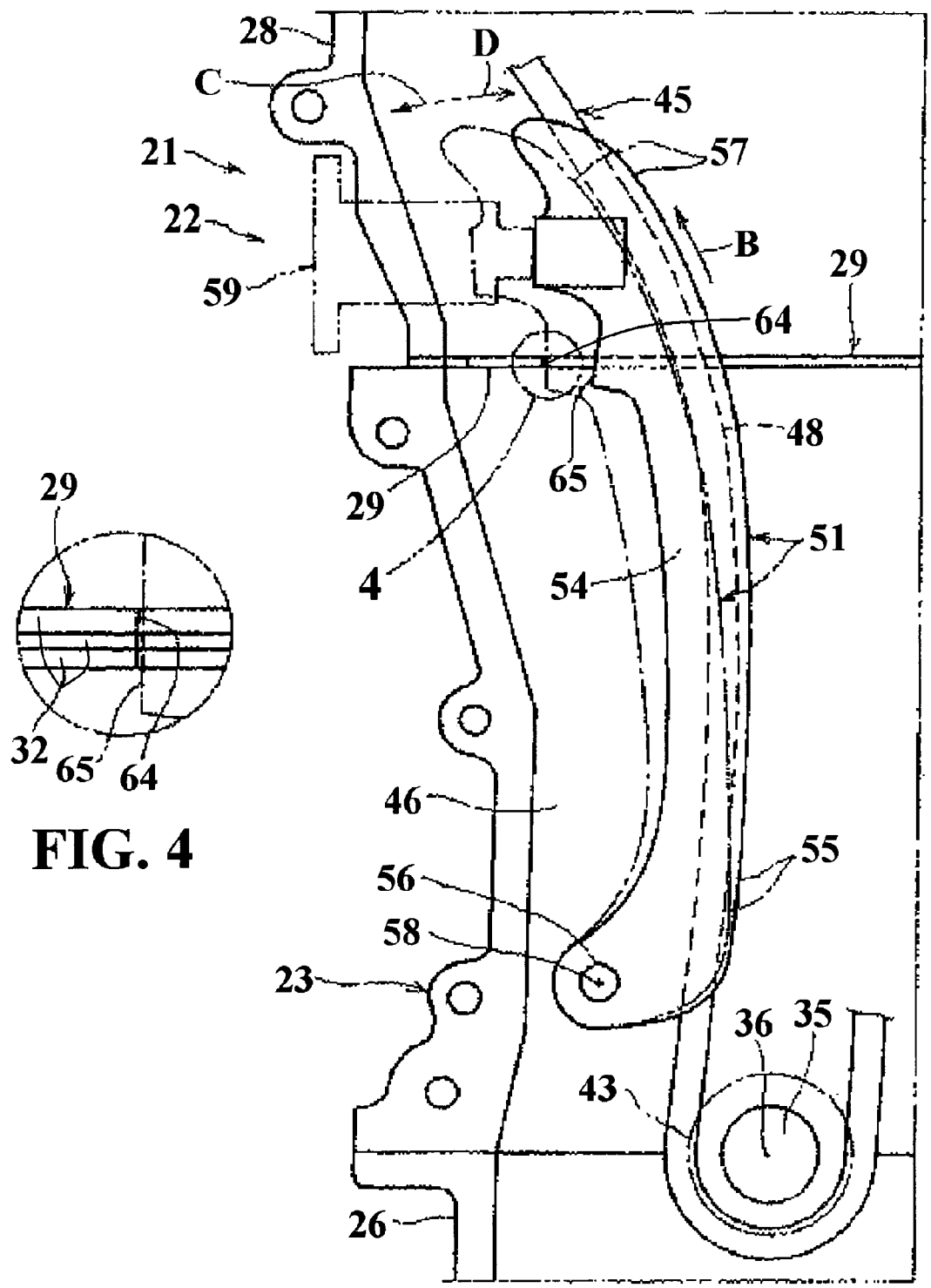
FIG. 3 is an enlarged view looking in the same direction as FIG. 2 and shows the tensioner arrangement.
FIG. 4 is an enlarged view of the area encompassed by the circle 4 in FIG. 3.

The top surface of the cylinder block 23, the underside of the cylinder head 28, and the gasket 29 respectively extend flat in the direction at right angles to the axes 25 of the cylinder bores 24. As best seen in FIG. 4, the gasket 29 is formed with plural (three) stainless steel plates 32 layered together with not shown interposed fibrous insulating layers.

The engine 21 is provided with pistons 33 inserted respectively in the cylinder bores 24 for reciprocation in the axial direction. These pistons 33 are coupled by connecting rods 34 to a crankshaft 35. The crankshaft 35 has a rotational axis 36 extending generally horizontally is supported in a manner to be described shortly within the lower part of the engine assembly 22. The crankshaft 35 is located between and rotatably supported between the cylinder block 23 and the bulkhead 26 by bearings (not shown).

The cylinder head 28 forming the upper part of the engine assembly 22 supports intake and exhaust valves (not shown) in an suitable manner. These valves are operated by suitable mechanisms from intake and exhaust camshafts 37 and 38. The intake and exhaust camshafts 37 and 38 are driven by a valve driving mechanism, indicated generally by the reference numeral 39, for controlling the valve opening and closing. The axes of the intake and exhaust camshafts 37 and 38 extend parallel to the axis 36 of the crankshaft 35. Finally, a cylinder head cover 41 is fixed to the top surface of the cylinder head 28 and closes the valve operating mechanism as described.

The valve driving mechanism 39 includes a timing drive, indicated generally at 42, to drive the camshafts 37 and 38 in timed relation with the crankshaft 35. The timing drive 42 includes a drive sprocket 43 fixed against rotation in a suitable manner to one end of the crankshaft 35. Driven sprockets 44 located above the drive sprocket 43 are non-rotatably fixed to the ends of the camshafts 37 and 38. A flexible transmitter, such as a timing chain 45, of an endless band shape, extends vertically, and girdles the drive sprocket 43 and the driven sprockets 44.

The ends of the crankshaft 35 and of the camshafts 37 and 38, and the timing drive 42 project outward from a vertical wall 46 on one end of the engine assembly 22 in the axial direction of the crankshaft 35. The vertical wall 46 is made up of vertical faces of the cylinder block 23, the bulkhead 26, and the cylinder head 28 and defines the rear side of a timing case.

A drive flight 47 of the timing chain 45 extends to the drive sprocket 43 from the driven sprockets 44 and the direction of chain movement of the flight 47 is indicated by the arrow A. A return or slack flight 48 extends from the drive sprocket 43 to the driven sprockets 44 and moves in the direction indicated by the arrow B.

The timing drive 42 is located near the outside of the vertical wall 46 of the engine assembly 22 to embrace, as seen along the axis 36 of the crankshaft 35 (FIGS. 1 to 3), the drive flight 47 and the slack or return flight 48 of the timing chain 45 are each provided with respective paired right and left tensioner mechanisms, indicated generally at 49 and 51 to give a predetermined tensile force to the drive flight 47 and/or prevent excessive slack of the return flight 48.

The drive side tensioner mechanism is comprised of a bearing arm 52 that extends vertically along the drive flight 47 of the timing chain 45 and is fixed to the vertical wall 46 by means of a pair of fasteners 53 to hold the bearing arm 52 into pressing contact with the drive flight 47.

The return side tensioner mechanism 51 is comprised of a pivotal arm 54 that extends vertically along the return flight 48 of the timing chain 45. A lower end 55 of the pivotal arm 54 is pivotally connected to the vertical wall 46 portion of the cylinder block 23 of the engine assembly 22 by means of a pivot shaft 56. Thus the top end 57 can swing in either counter clockwise or clockwise directions (indicated respectively by the arrows C and D) about an axis 58 that is parallel to the axis 36 of the crankshaft 35 and which is defined by the pivot shaft 56.

As can be clearly seen from FIGS. 2 and 3, the upper or top end 57 of the tensioner arm 54 extends well above the upper surface of the cylinder block 23 and with the cylinder head 28 removed it could pivot to a position that would prevent attachment of the cylinder head 28 to the cylinder block 23 and or could become damaged if assembly were attempted without pivoting the tensioner arm 54 to a clear position. In addition this ability for the tensioner arm 54 to pivot freely could also interfere with other assembly of maintance operations, as noted previously.

To complete the description of the construction and operation of the tensioner mechanism 51, an automatic tensioning device of any desired type, indicated generally at 59, is provided on the engine assembly 22 press the pivotal arm 54 against the slack flight 48 of the timing chain 45, thus automatically adjusting the pressing force of the tension arm 54 on the return flight 48.

Figure 5:
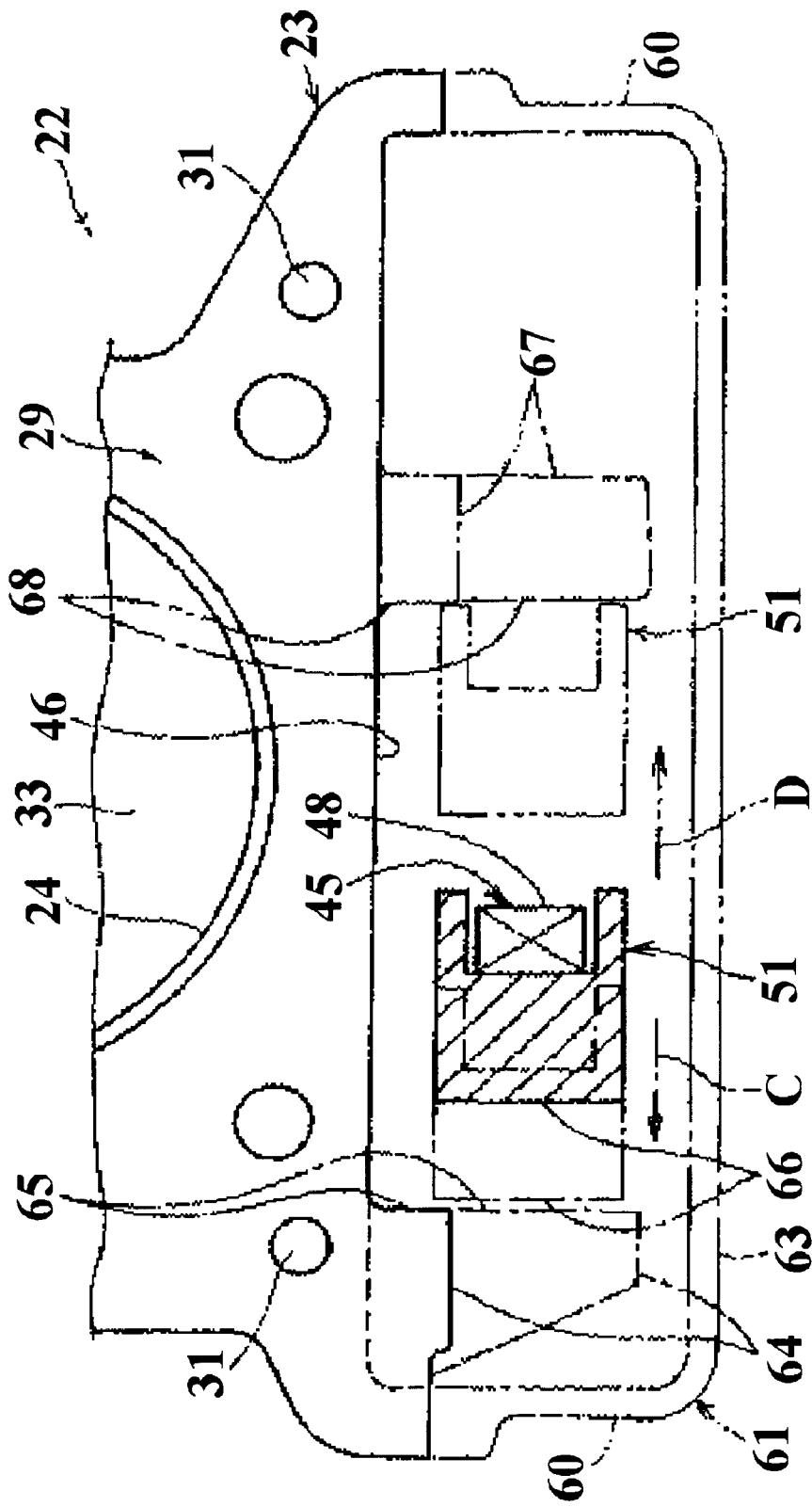
FIG. 5 is an enlarged cross sectional view taken in the direction of the line 5—5 in FIG. 2.

A timing case cover 61 is detachably affixed to the engine assembly 22 by means of a plurality of fasteners 62 for covering the timing drive 42 and the tension arms 52 and 54. The automatic tensioning device 59, passes through the timing case cover 61 and is supported by it. In other words, the automatic tensioning device 59 is supported with the engine assembly 22 through the timing case cover 61. As seen in FIG. 5, the timing case cover 61 is comprised of a cover body 63 of a plate shape covering the timing drive 42 and other components in the timing case and has a flange portion 60 extending integrally from the periphery of the cover body 63 toward the engine assembly 22. The fasteners 62 pass through suitable openings in this flange portion 60.

As a result of the foregoing construction, the operation of the tensioner arm 54 contacting and pressing on the return flight 48 of the timing chain 45 prevents the timing chain 45 from becoming too slack and holds the return flight 48 of the timing chain 45 from vibrating thus reducing noise and insuring smooth power transmission from the crankshaft 35 to the camshafts 37 and 38.

Referring now primarily to FIGS. 3–5, when looking along the axis 36 of the crankshaft 35, the upper middle part of the tensioner arm 54 passes across the cylinder head gasket 29. In accordance with the invention and to restrain the pivotal movement of the pivotal arm 54 during assembly or servicing a part of the cylinder head gasket 29 near the outside edge of the vertical wall 46 of the engine assembly 22 projects integrally project outward of the vertical wall 46 to form a restraining lug indicated as 64.

If the automatic tensioning device 59 is not present, as during assembly or some servicing operations, the tensioner arm 54 may swing by its own weight until it reaches a predetermined position (indicated with dash-and-dotted lines in FIGS. 3 and 5) where a shoulder 65 formed on the upper portion of the tension arm 54 contacts the edge 66 of the lug 64, so that the tension arm 54 is prevented from swinging further in the direction C. Thus the chain cover and cylinder head 28 can be attached to and removed from the cylinder block 23 of the engine assembly 22 without being obstructed with the tension arm 54.

In addition it is also possible, as shown in phantom lines in FIG. 5, to form a further lug 67 on another part of the cylinder head gasket 29 is made to project integrally outside the vertical wall 46 of the engine assembly 22 to form another edge 68, so that the lengthwise middle part of the tension arm 54 contacts the lug edge 68 to prevent further swinging of the arm 54 in the direction of the arrow D.

With the above arrangement, if the tension arm 54 is made to swing to the specified swing position and contact the lugs 64 and 67 to limit the pivotal movement of the tensioner arm. Thus assembly and servicing are facilitated without the need of special jigs or fixtures. In addition, since the lugs 64 and 67 project outward of the engine assembly 22 and are easy to see, verifying that the gasket 29 is interposed between the cylinder block 23 and the cylinder head 28 is facilitated.

As seen in FIG. 5, the projecting ends of the lugs 64 and 67 extend in the axial direction of the crankshaft 35 less than the full width of the tensioner arm 54. However and as shown in the further phantom lines, the lugs 64 and 67 can be extended to cover more than the full axial extent of the tensioner arm 64. In this way, since the area of the lugs 64 and 67 in plan view of the engine 21 increases, possible upward splash of lubricant oil from the oil pan 27 along with the upward motion of the return flight 48 of the timing chain 45 in the direction of the arrow B will be restricted with by the lugs 64 and 67 and immediately returned into the oil pan 27. Therefore, a specified amount of lubricant oil is always secured in the oil pan 27, so that the lubricant oil is used effectively.

Thus from the foregoing description it should be readily apparent that undesired degrees of pivotal movement of a tensioner arm during servicing assembly or disassembly is prevented by providing one or more projections on a removeable component of the engine such as the cylinder head gasket that provide contacting edges that cooperate with the tensioner arm. Of course those skilled in the art will readily understand that the described embodiments are only exemplary of forms that the invention may take and that various changes and modifications may be made without departing from the spirit and scope of the invention, as defined by the appended claims.

What is claimed is:

1. An internal combustion engine comprising an engine body rotatably journaling a crankshaft therein for rotation about a rotational axis, said engine body having an opening at an end thereof spaced from said rotational axis of said crankshaft and adapted to be closed at least in part by a cylinder head detachably connected thereto, said cylinder head journaling at least one camshaft for operating at least one valve supported thereon, at least one flexible transmitter for driving said camshaft from said crankshaft, a tensioner arm journalled for pivotal movement by said engine body and having a portion thereof engaged with said flexible transmitter for maintaining a tension therein, said tensioner arm having a portion that extends outwardly beyond said engine body opening, and a removable portion of said engine affixed relative to said engine body and said cylinder head and retained on said engine body when said cylinder head is removed from said engine body and positioned to extend into a portion of said engine body opening from said engine body to engage said tensioner arm and limit its pivotal movement when said cylinder head is removed from said engine body.

2. An internal combustion engine as set forth in claim 1, wherein the removable portion of said engine comprises a cylinder head gasket that is disposed at least in part between sealing surfaces of the cylinder head and the engine body.

3. An internal combustion engine as set forth in claim 2, wherein the portion of the cylinder head gasket that extends into the engine body comprises an extension of a part of said cylinder head gasket that is disposed between and seals adjacent surfaces of said engine body and another engine component affixed thereto.

4. An internal combustion engine as set forth in claim 3, wherein the another engine component comprises the cylinder head.

5. An internal combustion engine as set forth in claim 2, further including a timing cover affixed to an end face of the engine body and enclosing at least in part the flexible transmitter.

6. An internal combustion engine as set forth in claim 5, wherein the portion of the cylinder head gasket that extends into the engine body comprises an extension of a part of said cylinder head gasket that is disposed between and seals adjacent surfaces of said engine body and the cylinder head.

7. An internal combustion engine as set forth in claim 6, wherein the portion of the cylinder head gasket projection does not extend beyond the tensioner arm in the direction of the crankshaft axis.

8. An internal combustion engine as set forth in claim 6, wherein the portion of the cylinder head gasket projection extends beyond the tensioner arm in the direction of the crankshaft axis.

9. An internal combustion engine as set forth in claim 6 further including a second projection formed on the cylinder head gasket and extending on the other side of the tensioner arm from the first projection for limiting pivotal movement of the tensioner arm in the direction opposite that limited by said first projection.

10. An internal combustion engine as set forth in claim 9, wherein the portions of the cylinder head gasket projection do not extend beyond the tensioner arm in the direction of the crankshaft axis.

11. An internal combustion engine as set forth in claim 9, wherein the portions of the cylinder head gasket projections extends beyond the tensioner arm in the direction of the crankshaft axis.

* * * * *